United States Patent [19]

Wray

[11] Patent Number: 4,750,211
[45] Date of Patent: Jun. 7, 1988

[54] METHOD AND APPARATUS FOR IMAGE PROCESSING WITH FIELD PORTIONS

[75] Inventor: William R. Wray, Winchester, Mass.
[73] Assignee: Polaroid Corporation, Cambridge, Mass.
[21] Appl. No.: 895,591
[22] Filed: Aug. 14, 1986

Related U.S. Application Data

[63] Continuation of Ser. No. 518,743, Jul. 29, 1983, abandoned.

[51] Int. Cl.$^4$ .............................................. G06K 9/36
[52] U.S. Cl. .................................... 382/41; 358/160; 358/280; 382/49
[58] Field of Search .................. 382/16, 37, 38, 42, 382/43, 62, 63, 41; 358/160, 280

[56] References Cited

U.S. PATENT DOCUMENTS

| | | | |
|---|---|---|---|
| 3,553,360 | 1/1971 | Land | 178/6.8 |
| 3,600,505 | 8/1971 | Dobouney | 178/5.2 |
| 3,651,252 | 3/1972 | Land | 178/6 |
| 3,893,166 | 7/1975 | Pugsley | 358/80 |
| 4,090,243 | 5/1978 | Kotera | 364/526 |
| 4,174,514 | 11/1979 | Sternberg | 340/146.3 MA |
| 4,229,797 | 10/1980 | Ledley | 364/515 |
| 4,271,476 | 6/1981 | Lotspiech | 382/46 |
| 4,353,092 | 10/1982 | Bailey | 358/160 |
| 4,363,104 | 12/1982 | Nussmeier | 382/22 |
| 4,384,336 | 5/1983 | Frankle | 382/49 |
| 4,396,903 | 8/1983 | Habicht et al. | 382/42 |
| 4,510,618 | 4/1985 | Ataman et al. | 382/27 |
| 4,538,184 | 8/1985 | Otsura et al. | 382/50 |
| 4,545,069 | 10/1985 | Kermisch | 382/46 |

FOREIGN PATENT DOCUMENTS

| | | |
|---|---|---|
| 0084228 | 7/1983 | European Pat. Off. |
| 8100074 | 10/1981 | PCT Int'l Appl. |
| 8300593 | 8/1982 | PCT Int'l Appl. |
| 8202637 | 8/1982 | PCT Int'l Appl. |

OTHER PUBLICATIONS

Pugsley, Peter, *Pre-press Picture Processing in the Graphic Arts Industry*, IEEE Transactions on Communications, vol. COM-29, No. 12, Dec. 1981, pp. 1891–1897.
Chow, C. K. and T. Kaneko, *Boundary Detection of Radiographic Images by a Threshold Method*, Science and Medicine, 1972, pp. 1530–1535.
Rajala, S. and R. Figueiredo, *Adaptive Nonlinear Image Restoration by a Modified Kalman Filtering Approach*, ICASSP 80 Proceedings–IEEE Int. Conf. on Acoustics, Speech and Sig. Proc., vol. 2, pp. 414–417.
Bernstein, R., *Digital Image Processing of Earth Observation Sensor Data*, IBM Journal of Research & Development, vol. 20, No. 1, Jan. 1976, pp. 1–56.
McCann, J., et al, *Retinex Processing of Natural Images*, The Association for Research in Vision and Opthalmology Incorporated, May 1980.
McCann, J., Inter–Society Color Council, Feb. 1980.
Tajima, J., et al, *Color Analysis by Color Information Processing System* (CIPS-1) NEC Research & Development No. 47, Oct. 1977, pp. 13–18.

*Primary Examiner*—Leo H. Boudreau
*Attorney, Agent, or Firm*—Lahive & Cockfield

[57] ABSTRACT

A field of image information is processed with operations on a relatively coarse representation of the full field and with operations on a high resolution representation of only a portion of the full field. The partial results from operations on field portions may be formatted to yield a composite result for the full field. A photographic record of the image information may be read to provide the full-field representation and read again to provide the field-portion representation. This portion-by-portion processing of image information stored on a photographic record enables a computer with comparatively small memory capacity to execute relatively complex image processing tasks.

23 Claims, 9 Drawing Sheets

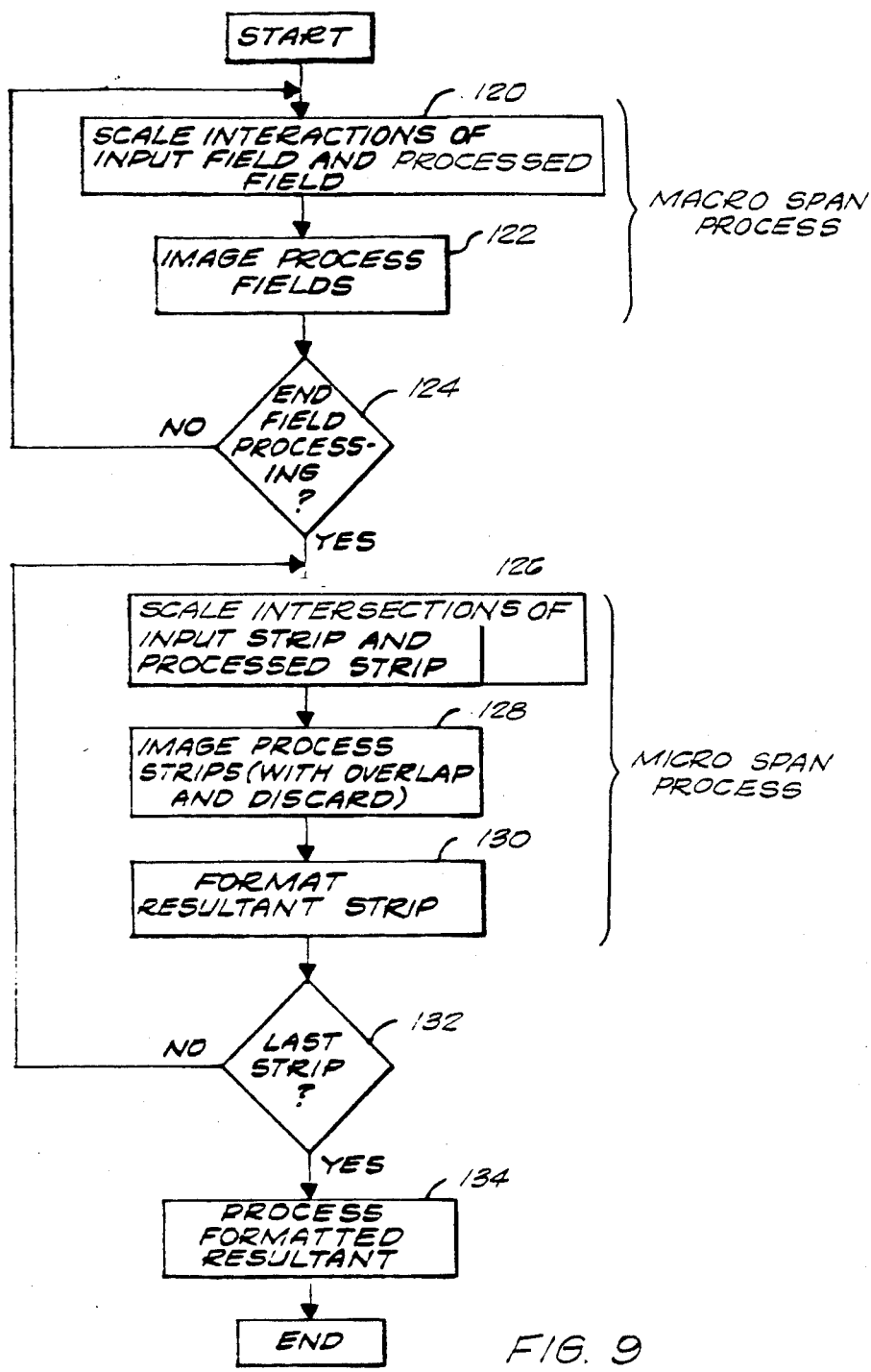

METHOD AND APPARATUS FOR IMAGE PROCESSING WITH FIELD PORTIONS

This application is a continuation of application Ser. No. 518,743, filed July 29, 1983, now abandoned.

BACKGROUND OF THE INVENTION

This invention relates to the processing of image information. In particular it provides a method and apparatus whereby a computer with limited capacity can nevertheless process a relatively large field of image information.

The invention can be used for processing image information of essentially any nature. In a typical instance the information represents a two dimensional array or field of values. Image processing within the scope of the invention includes, without limitation, such diverse practices as photography, television, printing and the graphic arts, and laser scanning. It further includes instances where there is no original scene, as encountered with images created with sonar techniques, with infrared techniques, with radar, with ultrasound and with computerized axial tomography (CAT) scanners as well as with other medical imaging instruments.

Image processing with a field of such information typically involves a vast number of concurrent operations, in order to process the information for all picture elements, i. e. pixels, of the field. The field-by-field processing of this information on a computer requires large and correspondently costly memory capacity to store the image information for all the pixels. For example, the computer storage of a square field having 512 pixels on a side, and in which one byte defines the field value for one pixel, requires a memory with a capacity of 262,144 bytes. The computer memory further must have at least twice this capacity to store such a field of input values and to store a like field of resultant values. More commonly, the memory requires three times this capacity, or over three-quarters of a million bytes, to store the pixel information for two input fields and for the resultant computed field.

It accordingly is an object of this invention is to provide a method and apparatus for processing image information with a computer having limited memory capacity relative to the size of the image field being processed.

Another object of the invention is to provide a method and apparatus which combines the aforesaid compact memory requirement with relatively high speed operation. The conventional full-reduction serial processing of a field of image information requires, as an elementary example, such undue time as to be essentially impractical.

A further object of the invention is to provide an image processing system in which one storage element is a photographic recording. A more particular object is that the system operate with plural references to the photographic, i.e. radiation-responsive, recording for input information. The term "photographic recording" (or record) is used herein in a broad sense to include a radiation-responsive record on a photochemical emulsion medium as well as on an electrostatic medium.

It is also an object of the invention to provide a method and apparatus of the above character suited for commercial application.

Other objects of the invention will in part be obvious and will in part appear hereinafter.

SUMMARY OF THE INVENTION

Some image processing, such as that which enhances an image, involves operations on both widely spaced sets of one or more pixels and on close sets of pixels. For example, U.S. Pat. No. 4,384,336 issued May 17, 1983, the disclosure of which is incorporated herein by this reference, discloses a form of image processing termed lightness imaging and which employs both local computations and global computations. Global computations are in effect macrospan computations in that they include operations with image values representing widely spaced locations of the image field. Conversely, local computations are in effect microspan computations in that they include operations with values representing closely spaced locations of the image field.

According to the invention, a field of image information is processed with both microspan operations and with macrospan operations. The macrospan operations are performed on a relatively coarse detail, low resolution representation of the full image field and the microspan operations are performed on fine detail, higher resolution representations of fragmentary portions of the full field. A limited, comparatively small number of values are sufficient to define both the coarse detail representation of the full field and the fine detail representation of a portion of the field. The computer which performs the operations accordingly always operates with only a correspondingly limited and comparatively small number of information bytes.

Another feature of the invention is that at least a portion of the input information for microspan operations is the resultant of a macrospan operation. That is, the results of operations with low resolution representations of field information are employed as background values for subsequent operations with higher resolution representations of the image field.

Further, the sets of values produced from processing portions of the image field can readily be formatted to provide a final composite resultant for the full field. The different resultants from each portion of the high resolution field information can be accumulated in a single large-capacity memory segment or can be recorded on a photo-responsive storage medium such as a xerographic plate or a photographic negative, to name illustrative instances.

Practice of the invention also features the discarding of certain edge results from the processing of a portion of the image field. The results to be discarded are those which represent computations of image information within a field portion with corresponding information from locations that are within the overall field but outside that field portion. Consequently, a preferred practice of the invention involves discarding—from the result of each processing step with a field portion—those values that result from computations with values at field locations outside the field portion, selecting field portions which selectively overlap, and replacing values discarded in one step with values developed in another step from processing a suitably overlapping field portion.

A further feature of an image processing system according to the invention is that a photographic recording functions as an information-storage element of the system. The recording is read more than once and at different times during an image processing operation.

According to one practice of the invention, a high resolution representation of the scene or other information field to be processed is stored. This input information can be stored, for example, in photographic form. The high resolution input information is compressed to provide low resolution representations of the field, as appropriate for efficient execution of macrospan operations. Arithmetic averaging, of electrical signals produced by scanning or other photoelectric conversion of the photographic storage of the input information, is one technique for attaining this compressing of the high resolution information.

In one embodiment, a photographic medium storing the fine detail image is scanned with high resolution. The resultant high resolution image information is compressed to provide the coarse detail representations for performing macrospan operations, but is not otherwise stored, aside from photographic retention of the image. The high resolution information employed in microspan operations is provided by another scan of the photographic medium. The latter scan proceeds on fragmentary strips of the full image, to provide from each strip the information for only a portion of the full image, as required for each microspan operation. The second scan thus reads at least a portion of the image field common to the area covered by the first scan. Only the limited quantity of high resolution information for each field portion is stored at any given moment. Hence this practice stores, in a digital electronic or like memory, only fine detail information for image strips, in addition to coarse detail information. The practice does not require the much larger memory that would be needed for storing fine detail information for the full image.

An alternative embodiment scans the image to be processed on a relatively coarse, low resolution, basis for producing a set of values that constitute a low resolution representation of the image field. Macrospan operations of the image processing then commence with that representation of the image field. A significantly higher resolution scan of the same information field occurs to provide a high resolution representation. The latter set of image values is available for performing microspan operations by the time the macrospan operations are complete.

The former practice uses only one, singleresolution, scanner or other input transducer for reaching the photographic record. The latter practice generally employs a scanning element with both low resolution and high resolution. Where two such scanners are used, the operations can overlap to yield advantages in operating time. In both noted embodiments, the photographic recording is scanned a plurality of times, to provide input information at different points in the system operation.

The invention thus provides improvements in image processing of the type that includes plural computational operations with field-representing values that represent, in different operations, spatially different locations of the field. According to one feature of the invention, an intermediate set of values representing substantially all locations of the image field is produced from at least one computational operation performed on a first set of field representing values. Each of plural further computational operations is performed on a different second set of values that represents a segmental portion of the same image field, to produce plural second resultant sets of values. Each second resultant set represents a segmental portion of the image field. A final or other resultant set of values representing the entire image field is produced in response both to the intermediate set of values and to plural second sets of values which represent different field portions.

Further in accordance with a preferred practice of the invention, the foregoing first set of values constitutes a relatively coarse detail, low resolution representation of substantially all locations of the image field. Each second set of values, on the other hand, constitutes a relatively fine detail, high resolution representation of a segmental portion of the same image field. The intermediate set of values is employed to produce the final resultant set of values by performing each further computational operation on both a second set of values, which represents a portion of the image field, and a further set of values produced from the intermediate values.

The several second resultant sets of values are formatted into the final set of values which repreare sents substantially all locations of the image field. This formatting is preferably done by storing each second resultant set of values on a photographic medium, typically as it is produced. The photographic medium thus receives and accumulates, in successive times, additional second sets of values, each of which represents a different portion of the image field being processed.

Yet another feature is that the different field portions selectively overlap. The overlap is such as to replace values-produced in one computational operation and which are erroneous due to a boundary factor with other values representing the same field locations and which are free of the boundary perturbations.

Further in accordance with features of the invention, a photographic record is provided of the image field to be processed. The photographic record is read multiple times in the processing of the image. At least one reading of the photographic record produces the first set of values which is used for the computational operation that produces an intermediate set of values representing substantially all locations of the image field. One or more further readings of the photographic record produce the sets of values that represent segmental portions of the image field.

One result of these features is that a single digital electronic memory or other read/write memory element of relatively small storage capacity can store a relatively coarse detail representation of the entire image field for use in computational operations that produce the intermediate set of values. The same memory element can store, in place of the relatively coarse image field information, a relatively fine detail, high resolution representation of a portion of the same image field for use in the computational operations on field portions. The photographic record serves as an information storage element, preferably of read-only character, for the input image field being processed. It is read more than once to provide image-field information required for the image processing and which otherwise would require extensive read/write memory for storage.

The invention accordingly comprises the several steps and the relation of one or more of such steps with respect to each of the others, and the apparatus embodying features of construction, combinations of elements, and arrangements of parts adapted to effect such steps, all as explained in the following detailed disclosure, and the scope of the invention is indicated in the claims.

BRIEF DESCRIPTION OF DRAWINGS

For a fuller understanding of the nature and objects of the invention, reference should be made to the following detailed description and the accompanying drawings, in which:

FIG. 9 illustrates a flow chart of image processing according to the invention.

DESCRIPTION OF ILLUSTRATING EMBODIMENT

Figure 1:
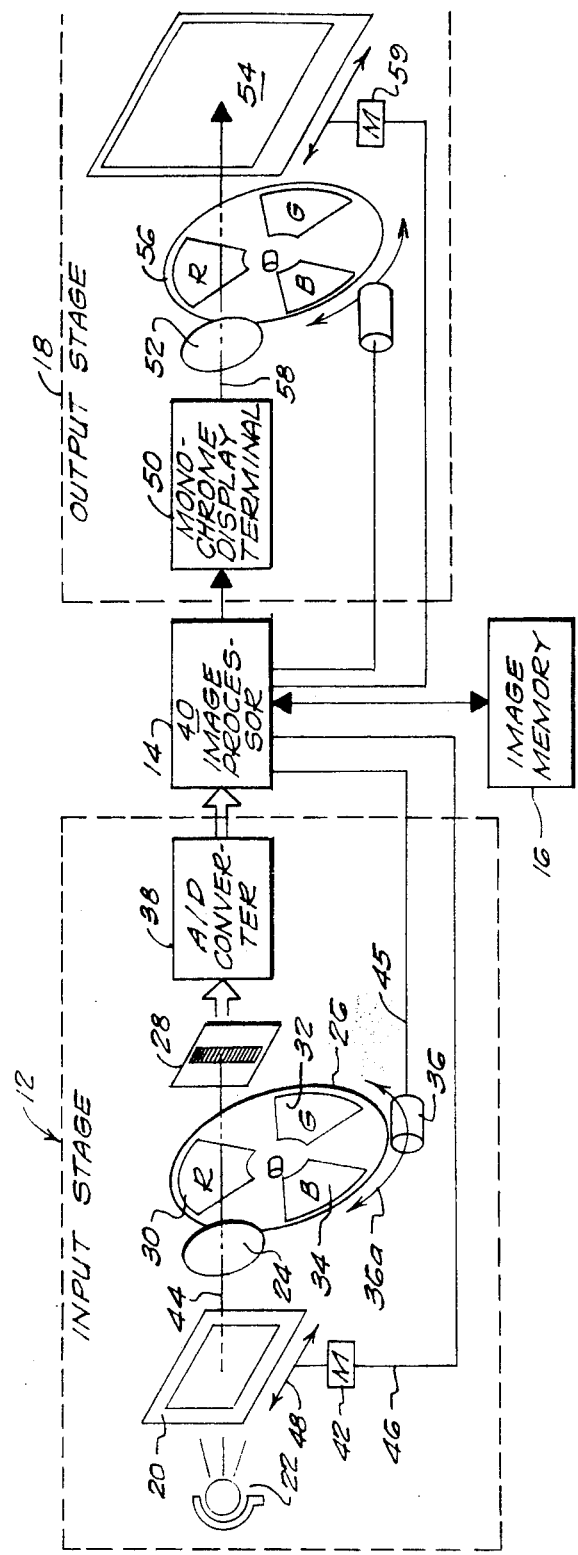
FIG. 1 is a block schematic representation of image processing apparatus for practice of the invention.

FIG. 1 shows an image processing system according to the invention for processing a color photograph. The illustrated system implements lightness imaging as described in the noted U.S. Pat. No. 4,384,336. The illustrated system has four portions, an input section 12, a processing section 14, an image memory section 16, and an output section 18.

The input section 12, viewed generally, provides a high resolution, i.e. fine detail, representation of an image. The high resolution information can be obtained by scanning an actual three-dimensional scene. Alternatively it can be obtained from storage, as from a magnetic recording or other recording in machine readable form. The illustrated input section 12 provides the high resolution information from a photographic transparency 20 and accordingly illustrates the latter practice with optical scanning of a photographic recording. A light source 22 directs light through the transparency 20 onto a lens 24 that projects the light through a rotating filter wheel 26 to a photolectric transducer 28. The filter wheel 26 has red, green and blue filters 30, 32 and 34, respectively, spaced apart about the periphery of an otherwise opaque disc. The filter wheel is rotated about its central axis by a motor 36 under external synchronization control as designated with the bi-directional arrow 36a. The illustrated transducer 28 is a charge-coupled device (CCD) having a single linear array of CCD transducing elements, illustratively with a (512×1) configuration. The resultant electrical signals from the CCD array are applied to an analog to digital converter 38 which applies corresponding digital transducer signals in parallel to an image processor 40 that forms the system processing section 14.

The illustrated input section 12 further includes a motor 42 that moves the photographic transparency 20 laterally in the image plane, in the direction of arrow 48, with a scanning motion across the optical path 44 along which the lamp 22, lens 24, filter wheel 26, and transducer 28 are aligned. The motor 42, like the filter-driving motor 36, is externally controlled. In the illustrated system, the image processor 40 is connected by lines 45 and 46 to each motor to provide the controlled movement of filter wheel 26 and, separately, of the transparency 20. A selectively moveable carriage, not shown and of conventional construction, mounts the transparency and is coupled with motor 42 for attaining this scanning movement.

With this construction, the illustrated input section 12 projects to the transducing array 28 the image or scene recorded on the transparency 20 and the illustrated linear array converts a line segment of the projected radiant energy to electrical signals. The line segment is selected by the transparency position provided with the scanning motor 42. The filter wheel 26 passes to the transducing array 28 different wavelength components of this line segment in controlled selected succession. The A/D converter 38 accordingly applies to the processing section 14 digital signals responsive to each line segment of the transparency and further responsive to the three constituent colors wavebands thereof. The scanning translation of the transparency 20 generates a continuous succession of such line segments that constitutes the entire scene in the photograph 20.

With further reference to FIG. 1, the image memory section 16 typically is a random access, digital electronic, read/write memory (RAM) of semiconductor construction. It includes memory sections for storing sets of input values for any given processing operation of the image processor 40 and at least a further memory section for storing a corresponding set of interim or resultant values which the processor develops.

The illustrated image processor 40 is an image processing computer operating with a stored program. Image processors for this operation and as further described herein are available commercially and can be provided by those skilled in this art using, for example, the teaching in the noted U.S. Pat. No. 4,384,336.

The system output section 18 in general converts the output data from the processing section 14 to a desired representation. In the illustrated system, the output section 18 includes a monochromatic cathode ray tube (CRT) display terminal 50, with independent controls for the X, Y and Z axes, which receives input signals from the image processor 40. The optical output image from the display terminal 50 is projected through a lens 52 onto an image recording medium illustrated as a photosensitive film 54. This film 54 can, for example, be part of a composite photographic sheet, such as a sheet of Polaroid brand film, on which the image can be printed directly. As described further below, the output image from the terminal 50 corresponds to a portion or strip of the input scene on the transparency 20, and the output section 18 selectively moves the output-recording film 54 to record each such strip at the proper position of the scene. For this purpose, the illustrated output film is carried on a carriage (not shown) which a motor 59 drives under processor control. The movement of the film 54 enables the output portion 18 to format different strips of processed image information into a composite representation of the full input scene.

Interposed in the optical path 58 between the display terminal 50 and the photosensitive sheet 54 is a color wheel 56. The color wheel 56 can be identical to the color wheel 26, with a succession of red, green and blue filters and rotatively driven and controlled by way of a motor under control of the image processor 40. Where desired, a single filter wheel such as the wheel 26 can be used for both the input section 12 and the output section 18 simply by arranging the system elements to direct both the optical input path 44 and the optical output path 58 along parallel directions and aligned with the common filter wheel, as those skilled in this art can provide.

The output section 18 of the illustrated image processing system thus receives processed image signals and converts them to a desired form, here for recording on a photosensitive medium. The resultant scene to which the photosensitive medium is exposed, and which it correspondently stores, represents the input image information which the input section 12 produces, with the representation being selected by the operation of the image processor 40. In a typical photographic practice, the processing provides lightness imaging as well as photographic enlargement and color enhancement.

With further reference to FIG. 1, the system of the invention can process a field of image information with an image memory section 16 having a comparatively small capacity relative to the number of pixels in the image field. In particular, lightness imaging involves comparing a first set of values for each pixel in the image field with a second set of pixel related values to produce a third set of values. This processing of a square image field having 512 pixels on a side, by way of example, and correspondingly having (512×512) or 256K values in each set, typically requires an image memory 16 with a capacity for storing at least three such sets, or a minimum capacity of roughly 768K bytes. Note that "K" represents the arithmetic value 1024, so that 256K arithmetically equals 262,144; and 768K is arithmetically equivalent to 786,432.

The system of this invention, however, requires an image memory 16 with only a fraction of this capacity, for example, less than 64K bytes. The invention attains this economy with several features. One is that the system incorporates a photographic recording of input information as a memory element in addition to the image memory 16, and which is read at different times during an image processing operation. Another is that the system performs some processing calculations on a coarse detail representation of the full image field and performs other processing calculations on segmental portions or strips of a higher resolution, finer detail representation of the image field. Both the coarse representations of the image, and the segmental strips of the high resolution representation of the image, can be stored in read/write image memory 16 of relatively small capacity.

The former calculations may be termed macrospan calculations and the latter ones may be termed microspan calculations. Macrospan calculations are image processing calculations which involve operations on relatively distant or widely spaced pixels in the image field. An example is the global calculations involved in lightness imaging. These calculations can be performed with relatively coarse representations of an image field. Such representations can be defined with relatively few values and hence can be stored in an image memory of relatively small capacity. Microspan calculations are calculations which involve operations with only proximal or closely spaced pixels in the image field, as exemplified by the local calculations involved in lightness imaging. A segmental strip of the high resolution image field to which these calculations are applied can also be defined with relatively few values and hence can be stored in an image memory of relatively small capacity.

Further, by way of example, a coarse representation of the foregoing (512×512) square field, and having only 64 values per side, can be stored in a (64×64) byte memory, i. e. a total capacity of approximately 4K bytes. A 16-pixel wide strip of the same field at full resolution requires (512×16) bytes of memory for storage, or only 8K bytes capacity. Both latter storage requirements are far less than the 768K capacity required to store the entire field at full resolution.

High resolution image information for such image processing computations is generally provided essentially directly from the scene or other spatial image, and low resolution information can be provided either from the scene or by averaging down higher resolution information. More particularly, where the input scene or image is recorded in photographic form, a high resolution scan of the photographic recording provides the high resolution information. Low resolution information can be produced with a correspondingly low resolution scan of the input recording or by an averaging processing of high resolution information.

Figure 2:
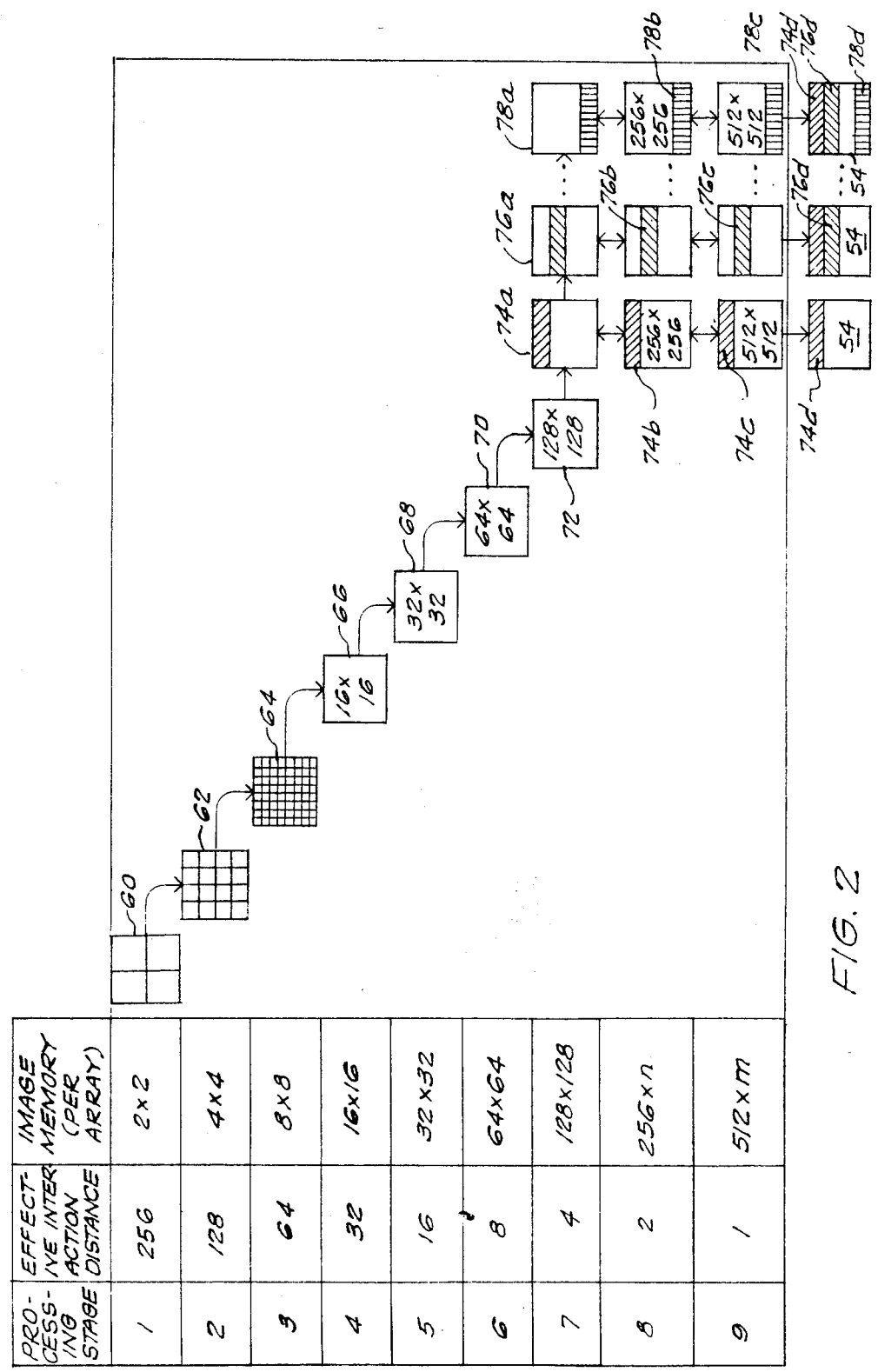
FIG. 2 is a diagrammatic representation of image processing according to one practice of the invention.

FIG. 2 illustrates one operating sequence of the FIG. 1 system 10 for executed lightness imaging with the zoom technique described in the U.S. Pat. No. 4,384,336 under the heading "Multiple-size Pairings" and with specific reference to FIG. 10 thereof. The illustrated sequence involves nine processing stages or steps as designated in the left column of FIG. 2 with the numbers one through nine. Information pertaining to each processing stage appears in rows extending to the right from the stage number.

The illustrated first stage of processing involves macrospan operations on a coarse, low-resolution, two-pixel by two-pixel array 60 that represents the entire field of image information. The image memory 16 requires only a two-byte by two-byte capacity to store one field of this information. The image processor 40 in FIG. 1 can provide this low resolution, two-by-two representation of a full image field by averaging a high resolution image field. e.g., by averaging information received from the transducer 28. The image processing operation performed in this stage compares adjacent ones of the coarse pixels. In terms of a high resolution fine detail image of 512 pixels by 512 pixels, the effective distance between the elements being compared is 256 pixels, as the second column of FIG. 2 shows. In particular, the calculation in this illustrated first lightness imaging stage pairs a (2×2) field of initialized old product values with the coarse (2×2) field of values obtained from the input transparency 20. The processing produces a new (2×2) field of combined values, after resetting of averaged product values.

The next stage of the illustrated sequence operates with arrays 62 of four pixels by four pixels. The old product values for this stage are obtained by expanding by two the (2×2) array of averaged product values that resulted from the first stage. This set of values is combined with a (4×4) array representing the entire image field. The latter image information can be obtained as described below with reference to FIG. 3, or from another scan of the input transparency 20 with appropriate scanning resolution and/or with post-scanning averaging. The image memory 16 accordingly stores, for the second stage, an input set of old product values requiring 4 bytes ×4 bytes, a second input set of values of like size and representing the (4×4) array of the image being processed, and a third like-sized set of values representing the resultant averaged products. The effective distance between locations being compared in this second stage is 128 high-resolution pixels, as designated in the second column of FIG. 2.

With further reference to FIG. 2, the illustrated operating sequence proceeds to stage three, in which each set of values being processed is an (8×8) array 64, again representing the full image field and in which the effective distance between locations being compared is 64 high resolution pixels. In the fourth illustrated stage, each array 66 has 16 values ×16 values, in the fifth stage each set of values being processed is a (32×32) array 68, and in the sixth stage each set of values is a (64×64) array 70. The illustrated seventh processing stage is similar, processing the full image field and comparing locations spaced apart by four high resolution pixels. Each set of values being processed is a (128×128) array 72 and the image memory 16 of the system 10 is required to store three such arrays, one being the old product value, one being the new coarse representation of the image field and the third being the resultant averaged product values. This requires a total image memory capacity of approximately 48K bytes.

At this juncture the sequence of FIG. 2 terminates performing operations with a full image field. Instead, the image processing operations of stages eight and nine are performed with strips of the image field. In the illustrated sequence, each such strip is processed from the intermediate resolution at the end of stage seven through stages eight and nine to the desired final high resolution and then an adjacent strip is processed in like fashion.

As shown at the lower right in FIG. 2, the output stage 18 of the FIG. 1 system stores the resultant information for each strip on the output film 54 in a manner that assembles these fragmentary results into a final composite representation of the full image field.

In particular, with continued reference to FIG. 2, a first strip 74a of the (128×128) array 72 of averaged product values resultant from step seven is, in stage eight, expanded in both directions by a factor of two to yield a (256×256) array. The expanded strip, illustrated as constituting an array of (256×8) values, is processed with a like strip of the input image field. Two rows of the resultant (256×8) array of averaged product values, however, are discarded for boundary considerations, as described further hereinafter. In processing stage nine, the remaining (256×6) array is expanded in both directions by a factor of two. The resultant (512×12) array of values is processed further with a like-sized array of high precision, fine detail values from the original image field. Two rows of the resultant array are discarded, again due to boundary factors, leaving a (512×10) array of final values.

These averaged product values which result from processing stage nine form a high resolution, fine detail strip 74d of the image field. This strip is a final resultant from the FIG. 1 image processor 40. As indicated in FIG. 2, it is applied to an output medium, in the form of the film sheet 54, for storage and formatting with subsequently processed strips.

The illustrated system then processes the next successive segmental strip 76a of the array 72 produced in stage seven. The resultant stage nine values constituting a resultant averaged product strip 76d are recorded on the photosensitive sheet 54 adjacent to the values from strip 74d, as appears at the lower right in FIG. 2. Successive segmental strips of the array of values produced from processing stage seven are processed in this manner, and the resultant averaged product values formatted on the output medium which the photosensitive sheet 54 forms. This process continues until the last, bottom strip 78a is processed to form a resultant image strip 78d which is formatted to complete the final display or other output.

FIG. 2 shows that the image memory 16 capacity required per array for stage eight is (256×n) bytes, and is (512×m) bytes for stage nine, where "n" and "m" are the number of rows of picture elements in the largest strip processed in the respective stage. In the example described, (n=8) and (m=14).

Figure 3:
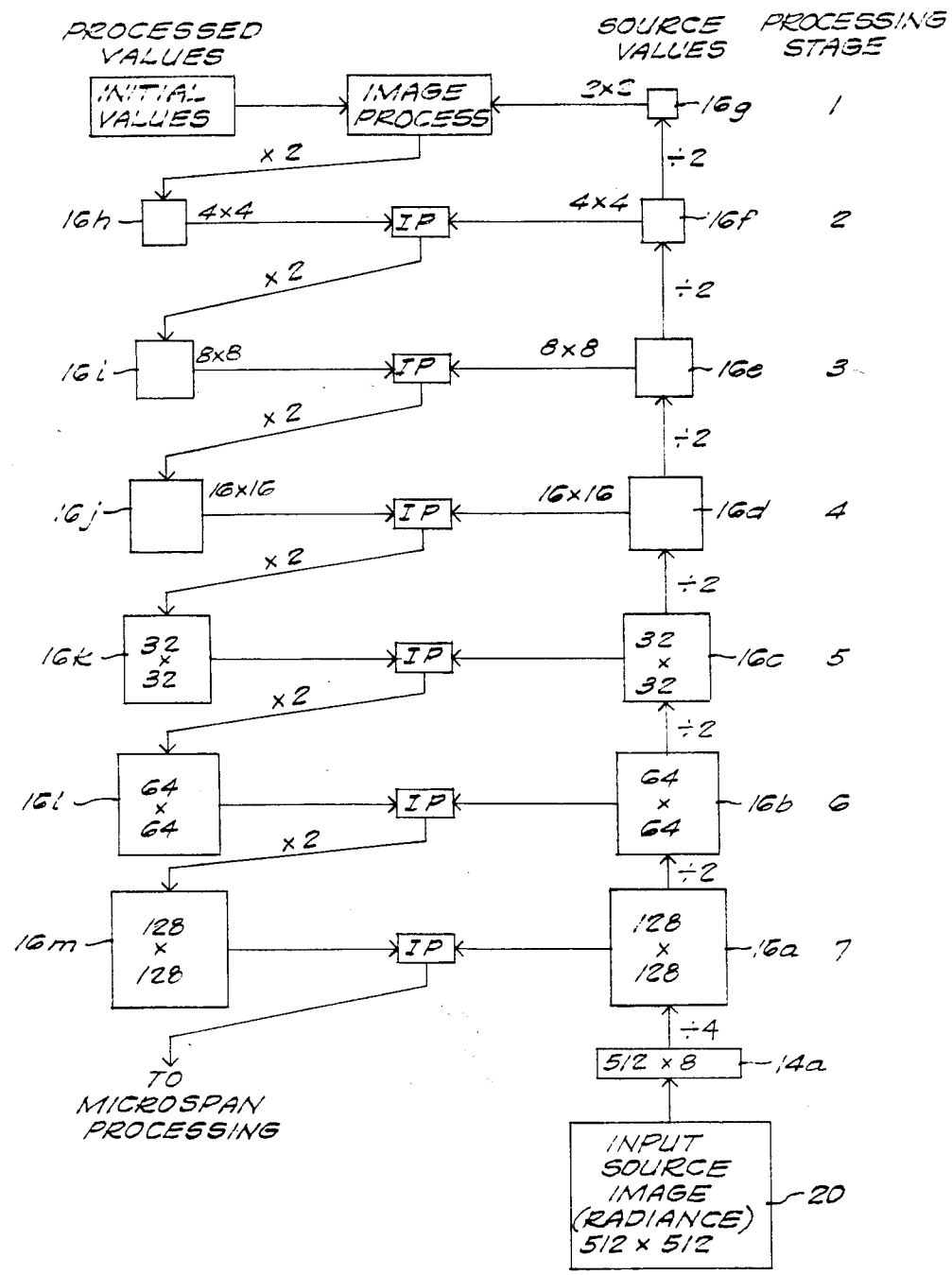
FIGS. 3 and 4 diagram, respectively, macrospan and microspan features of the FIG. 2 practice of the invention.

FIG. 3 shows in further detail the information storage for one practice of the macrospan operations, e.g. stages one through seven, of the FIG. 2 sequence with the system of FIG. 1. The input source image to be processed, as stored in the photographic medium 20, is shown at the lower right. It is illustrated as having a resolution of (512×512) pixels. The system input stage 12 reads the source image, typically row-by-row, and stores in a processor register 14a or other read/write memory element the radiance information for one strip of this image. Where each illustrated strip represents (512×8) pixels, by way of example, the register 14a accordingly stores a like number of bytes. The processor compresses the strip representation by a factor of four, e.g., to (128×2) in the above example, and accumulates in an image memory section 16a these compressed, e.g. averaged, radiance values from successive strips of the input image. The memory section 16a thus, at the end of the image reading operation, stores a full array of compressed radiance values, e.g., of (128×128) values. These values are used for stage seven processing, as FIG. 3 indicates along the right margin.

With further reference to FIG. 3, the image processor 40 (FIG. 1) compresses the array of values in memory section 16a by factors of two to produce—and store—arrays of radiance information required for the remaining stages one through six. The illustrated processor hence produces and stores a (64×64) set of radiance information in memory section 16b, a (32×32) set in section 16c, a (16×16) set in section 16d, an (8×8) set in section 16e, a (4×4) set in section 16f, and a (2×2) set in section 16g. Note that the full (512×512) set of radiance information is stored only in the input transparency 20. Each strip of fine detail information in register 14a is, in this example, discarded after it is read out for compression and storage in memory section 16a. Note also that all the illustrated memory sections may, in practice, not be separate locations in the image memory 16. Rather, the same locations may, at different times, form different ones of the several illustrated sections.

FIG. 3 further shows that the image processor 40 executes the first stage operation by image processing the radiance information in memory section 16g with a like-sized set of initialized values. The resultant array of combined values, which corresponds in size to the FIG. 2 array 60, is expanded by two to produce a (4×4) set of processed values that is illustrated as stored in memory section 16h. Successive image process and expand operations produce increasingly finer detail and correspondingly larger-valued sets of processed values which are represented as stored in memory sections 16i, 16j, 16k, 16l and 16m. The last is the result of stage seven.

Figure 4:
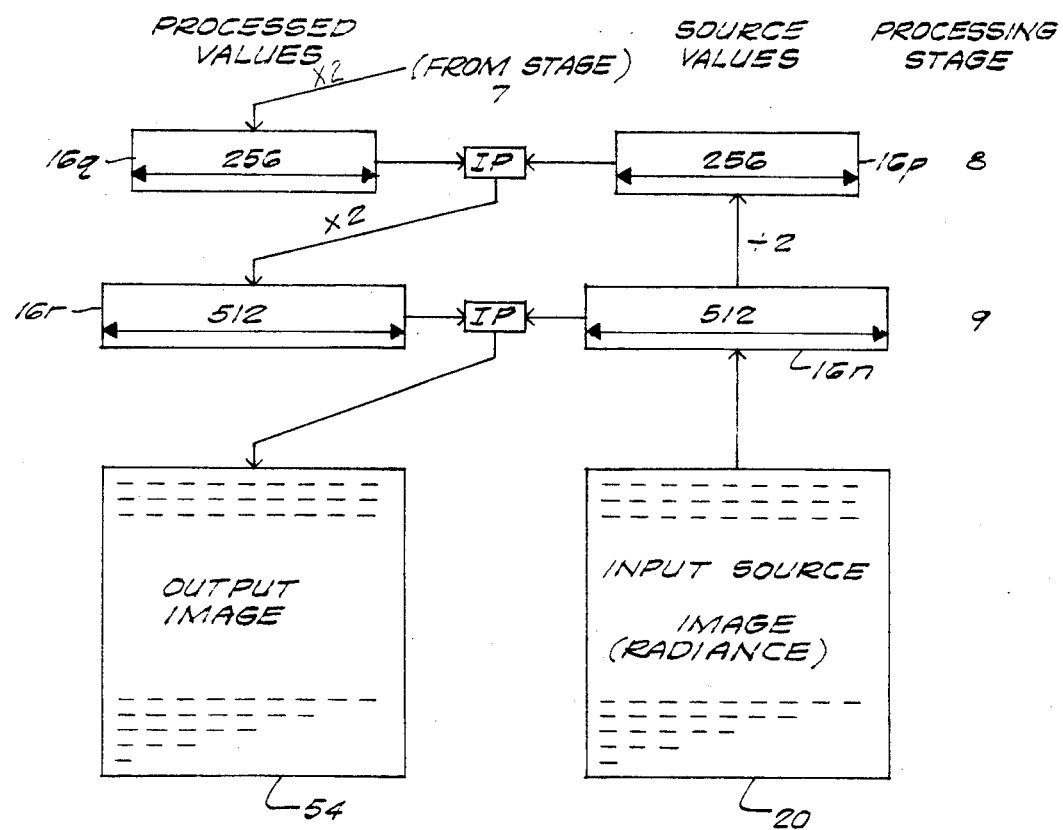
Figure 5:
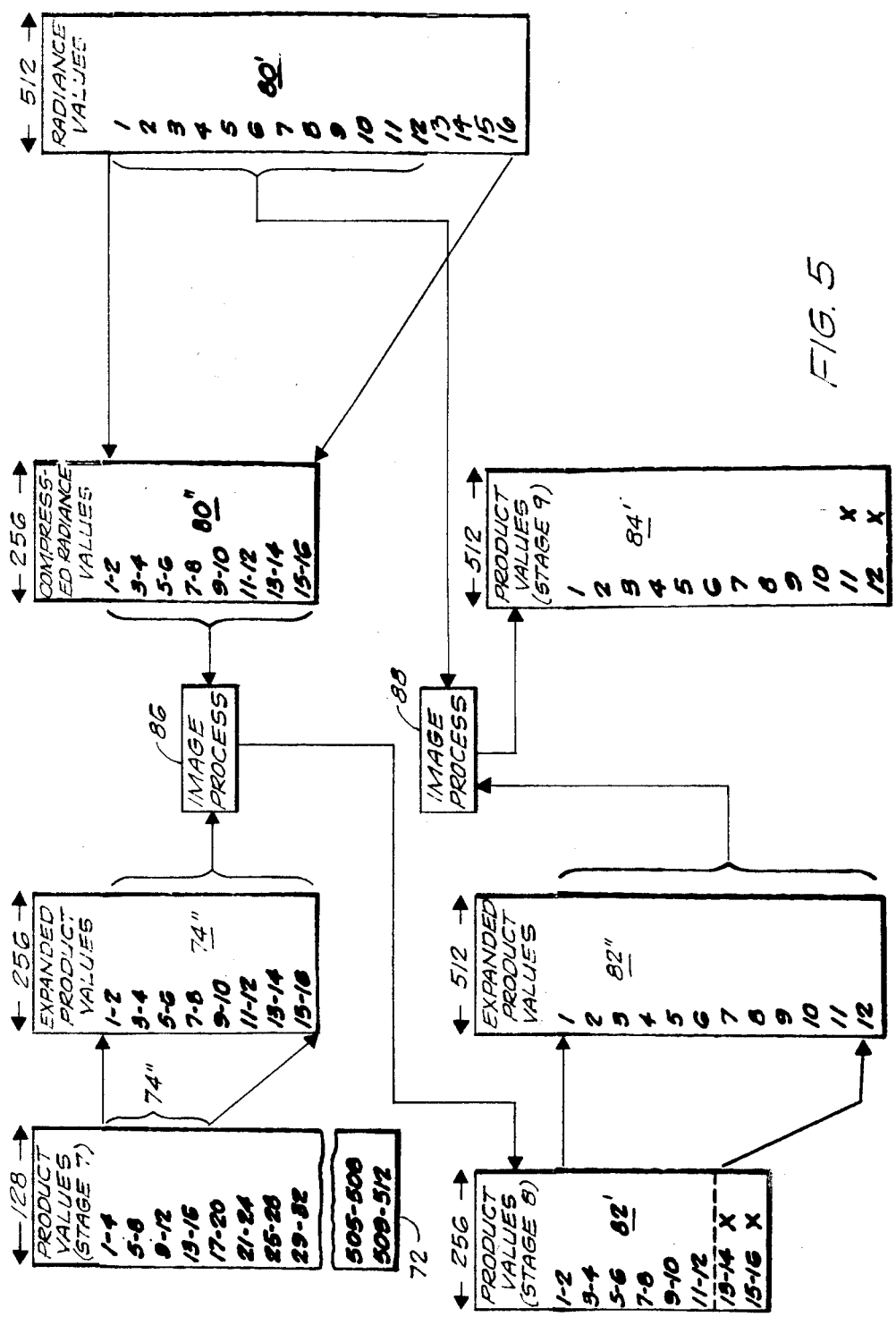
FIGS. 5, 6 and 7 illustrate portion-by-portion processing respectively at the top, within, and at the bottom of an image field.
Figure 6:
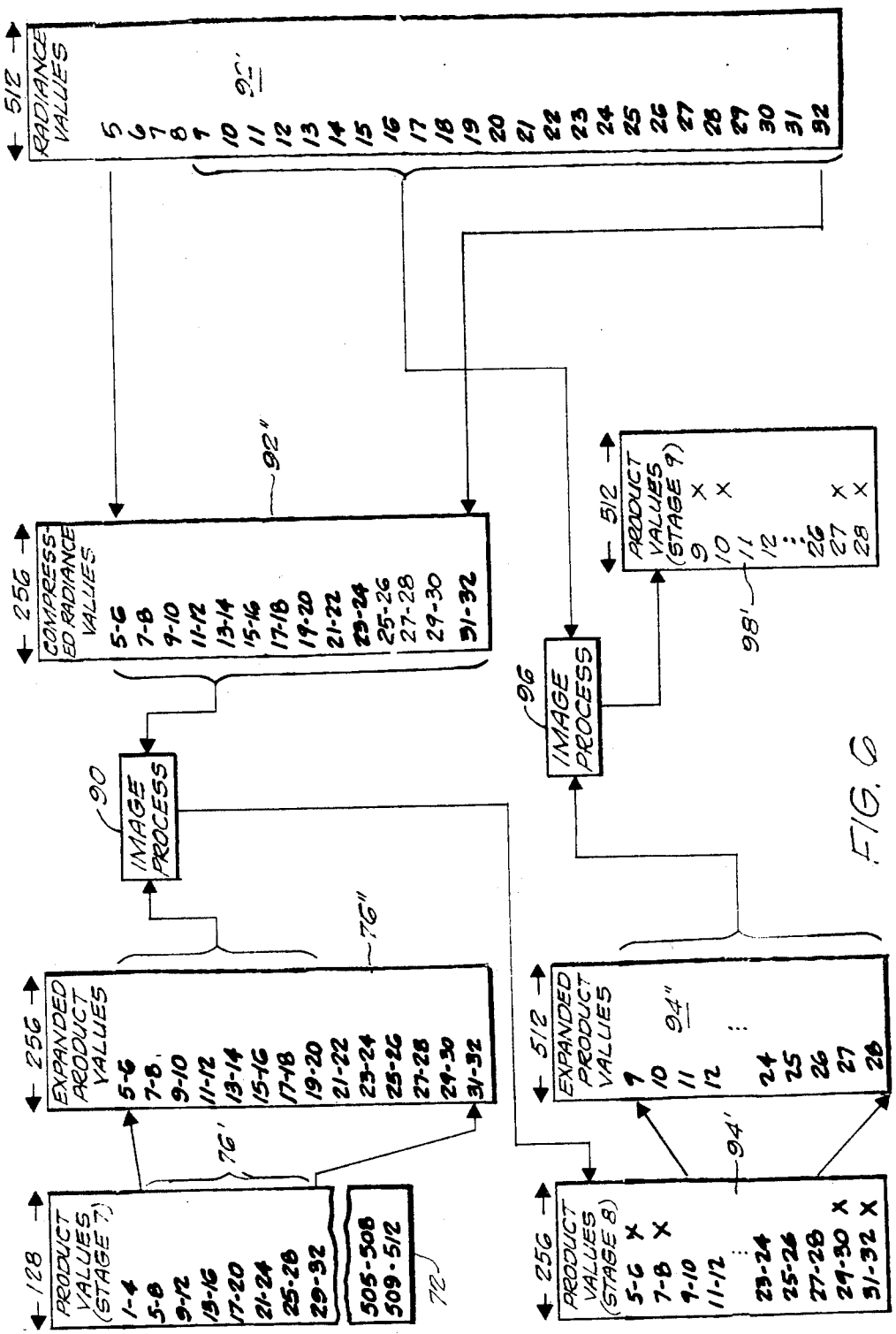
Figure 7:
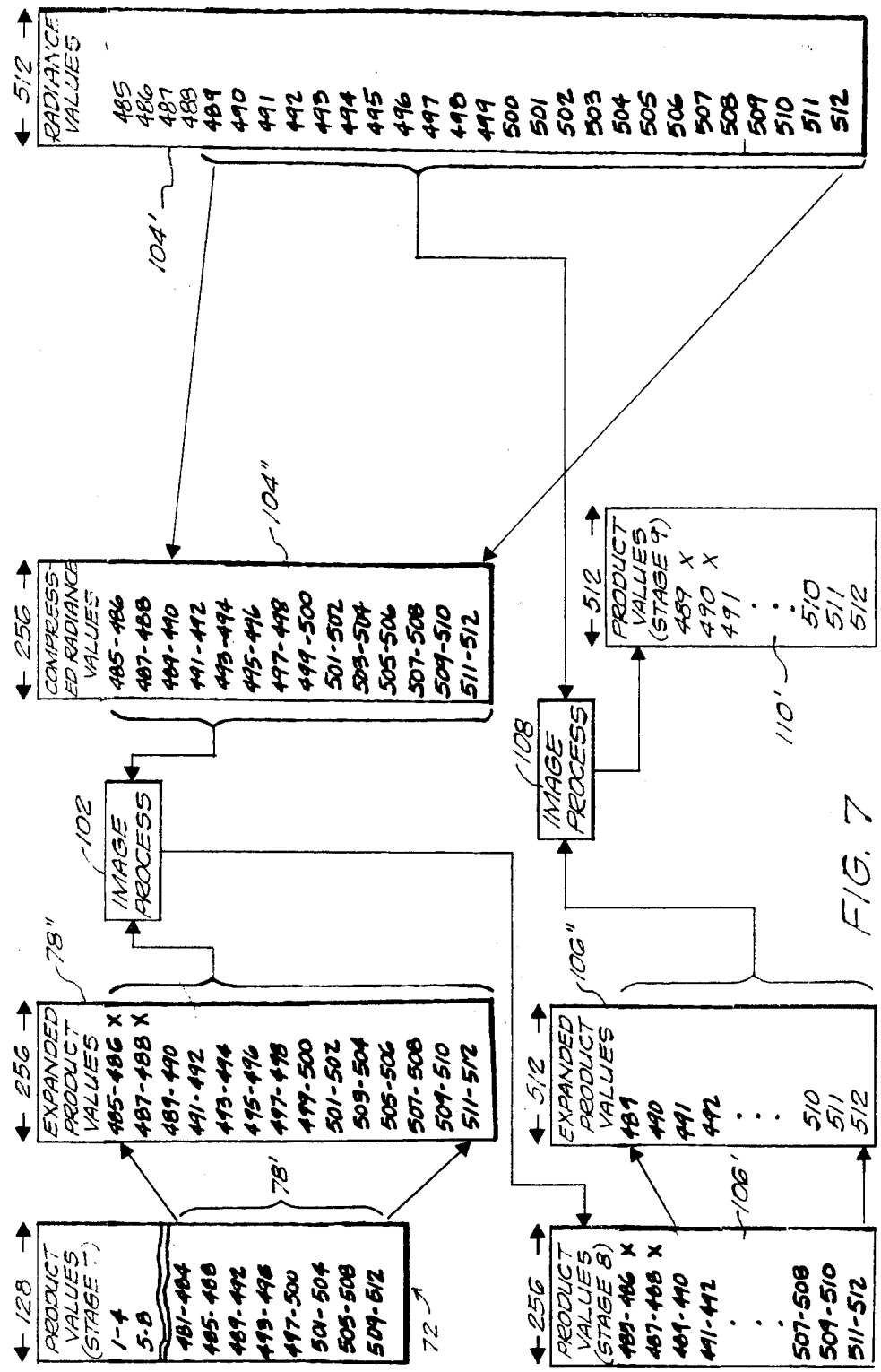

FIG. 4 shows, like FIG. 3, information storage in the FIG. 1 system for one practice of microspan operations, e.g. stages eight and nine of the FIG. 2 sequence. The input, source information for these operations is obtained by again reading the source image of the photographic medium 20. Only a portion of the full image information, as required for each iteration of stage nine as illustrated below with reference to FIGS. 5, 6 and 7, is stored in a memory section 16n. This source information is compressed by two and the resultant set stored in a section 16p, for stage eight processing.

FIG. 4 shows that further memory sections 16q and 16r store sets of processed values for use in stages eight and nine. In stage eight a strip of values produced in stage seven is expanded by a factor of two and image processed with the source values in memory section 16p. The resultant values are expanded and stored in section 16r, and image processed with the source values in section 16n. The values produced in this final image processing operation are applied to the system output stage 18 for formatting and storage on the output medium 54.

The embodiment of FIGS. 3 and 4 involves several scans of the input photographic record 20. One scan of the entire image field is used for the macrospan operating stages which FIG. 3 shows. Several scans of overlapping portions of the image field are used for the microspan stages according to FIG. 4. In particular, the illustrated processing of each strip through stages eight and nine involves a reading of a different portion of the photographic input information. The image information read during each scan is stored in read/write memory, but may be erased prior to the next scan, or read, of the record 20. Hence the same read/write memory elements can store image information obtained from the different readings of the photographic record.

FIG. 5 shows in further detail operations in stages eight and nine of the strip sequential processing of FIG. 2 for the top strip 74a of the (128×128) array 72 of stage seven. This array 72 of product values is shown at the left side of FIG. 5. The first row of values in this array represents, as labelled, pixel rows one, two, three and four of the high resolution image field, i.e. of the square field having 512 pixels per side. The second row of values represents pixel rows five through eight, and the last row represents pixel rows 509-512, all as labelled.

The first operation in the illustrated processing stage eight is to expand the (128×4) set 74' of values that forms the top strip 74a by a factor of two to form a (256×8) set 74" of expanded product values. The next operation, for lightness image processing, combines that set as representing old product values with a like-sized set of values which constitute a strip of the original image information being processed. The input section 12 of the system 10 of FIG. 1 provides the latter set by scanning or otherwise reading the original input scene of the transparancy 20. FIG. 5 illustrates, on the right side of the drawing, the resultant (512×16) set 80' of radiance-responsive values which represent pixel rows one through sixteen of the high resolution, fine detail input information obtained in this manner from the transparency 20.

After the image processor 40 in the processor section 14 averages this set of values down by a factor of two to a set 80" having the same size as set 74", it executes an image process step 86 that combines the resultant values of the sets 74" and 80" according to lightness imaging techniques to produce a further set 82' having (256×8) averaged product values. The illustrated image process step 86 performs two sequences of value comparisons, and each sequence involves four such comparisons. A first comparison is between each value in the set 74" and the value at the same location one row up in set 80". A second comparison is between each value in set 74" and the value at the same location one column to the left in set 80". The third comparison is between values one row down, and the fourth is between values one column to the right.

Comparisons of values at boundaries of a set with locations outside the full field, i.e. beyond an edge of the image field, are resolved with known techniques (see U.S. Pat. No. 4,384,336). However, comparisons of values at a boundary of either set 74", 80" with locations within the field but outside either set produce erroneous results. Values that include such strip-boundary errors, therefore, are replaced. More particularly, with continued reference to FIG. 5, the foregoing two sequences of lightness imaging processing in step 86 twice compares values from a bottom strip-boundary row of one set 74" and 80" with a row in the other such set located below it, i.e. with the row that represents pixel rows 17 and 18. However, the latter row is outside of both sets 74" and 80". The results of these two comparisons are not valid, and are discarded. This is illustrated in FIG. 5 with the "X" in each of rows 13-14 and 15-16 of the resultant set 82' of values. Accordingly, only the top six rows of values in set 82' are used in subsequent processing. The discarded values are replaced in a subsequent operating stage with values that are free of strip-boundary error.

FIG. 5 further shows that the set 82' of values produced in processing stage eight is, after discarding the values in the lower two rows, expanded by a factor of two to form a set 82" of (512×12) values and which corresponds to the top twelve pixel rows. The lightness image processing of stage nine combines with step 88 the expanded product values in set 82" with the high resolution radiance-related values of the first twelve rows of set 80', to produce a set 84' of combined or product values. The processing again involves, like step 86, comparisons of the values in the bottom two strip-bounding rows of sets 82" and 80' with values in rows that are outside either set and hence are not present. The lower two rows of values in set 84' are therefore discarded, as designated with an "X" in each such row.

The remaining (512×10) set 84' of values represents finally processed image information. These values accordingly are applied by the FIG. 1 image processor 40 to the output section 18, illustratively for recording on the photosensitive sheet 54.

FIG. 6 is a representation like FIG. 5 for the expand, compress, image process, and boundary discard operations which the system 10 of FIG. 1 executes in processing stages eight and nine of the FIG. 2 operation for the second strip 76a of the array 72 produced with processing stage seven.

The first step in the illustrated operation of FIG. 6, in processing stage eight, is to expand the set 76' of product values that constitutes strip 76a of array 72 by a factor of two. The illustrated set 76' has values for pixel rows 5-32 of the desired final high precision image field. These values are processed with the sequence which FIG. 6 shows to produce a final set of values having sixteen rows, numbered 11 through 26, of the final image field. More particularly, the expanded set 76" produced in stage eight is combined in image process step 90 with a like-sized set 92" of compound radiance values produced by compressing, i.e. averaging down, by a factor of two a (512×28) array set 92' of radiance-related values produced from the original input information to the system 10. The result of this image process step 90 is a like-sized set 94' of product values. However, step 90 produces invalid, strip-boundary, values in the top two rows and in the bottom two rows of the value set 94'. These rows of values are accordingly discarded. That is, the top two rows of set 94', designated rows 5-6 and 7-8, and the lower two rows designated 29-30 and 31-32, are discarded and not used in further processing.

With further reference to FIG. 6, in processing stage nine, the remaining valid values of set 94' are expanded by a factor of two to form a (512×0) set 94''. This set of values is image processed in step 96 with the same-numbered rows of values in set 92' to produce a final set 98' of values. The boundary rows of values combined with values outside the sets 94'' and 92' in step 96, i.e. the two upper rows designated 9 and 10 and the two lower rows designated 27 and 28 are discarded from the resultant set 98' of values. This leaves a final (512×16) set of values ready for outputting with the output stage 18 of the FIG. 1 system 10. The output stage accordingly formats the processed image strip which these sixteen rows of values produce with the image strip produced from the first ten rows of values, previously produced as described with reference to FIG. 5, to complete rows 1-26 of the output representation of the image field of interest.

It will now be apparent that the strip 76a overlaps strip 74a by the amount, i.e. number of rows, required to replace values discarded due to strip-boundary errors.

The illustrated FIG. 1 system repeats the sequence of operative steps shown in FIG. 6 for each successive strip of values in the array 72 (FIG. 2). Each such repetition of the FIG. 6 operation produces additional finally processed rows of values of the output image field. Each operation processes an initially oversized set of values which overlaps the previously processed set. The operations include the replacement of strip-boundary errors, as described, with values free of such errors.

FIG. 7 shows that the execution of processing stages eight and nine of FIG. 2 for the last, bottommost strip 78a of the array 72 produced in stage seven proceeds essentially the same as the processing of the first strip as diagramed in FIG. 3. In particular, the (128×8) set 78' of values for strip 78a is expanded by a factor of two to form a (256×14) valued set 78''. This set is image processed in step 102 with a like-sized set 104'' of radiance-related input values which the illustrated system derives from the system input portion. The resultant values constitute a set 106' that has invalid strip-boundary values in the upper two rows. Accordingly, these rows of values are discarded. In processing stage nine, the remaining rows of values in set 106' are expanded again by a factor of two to form a (512×24) valued set 106''. That array of values is image processed in step 108 with radiance-related values for the same rows from a set 104' to produce a resultant set 110'. The upper two rows of values in this set, representing pixel rows 489 and 490, have already been produced without strip-boundary error and printed. The remaining subset of (512×22) values is ready for outputting to the system output stage 18 and formatting with the resultant values developed previously. This completes one full operation of the image processing system according to the illustrative processing sequence diagrammed in FIG. 2. A complete composite image field of resultant values is recorded on the photosensitive sheet 54, which can be photographically processed to produce the desired visible representation of the image being processed. Other storage and final processing of the resultant image field of values can of course be practiced.

Figure 8:
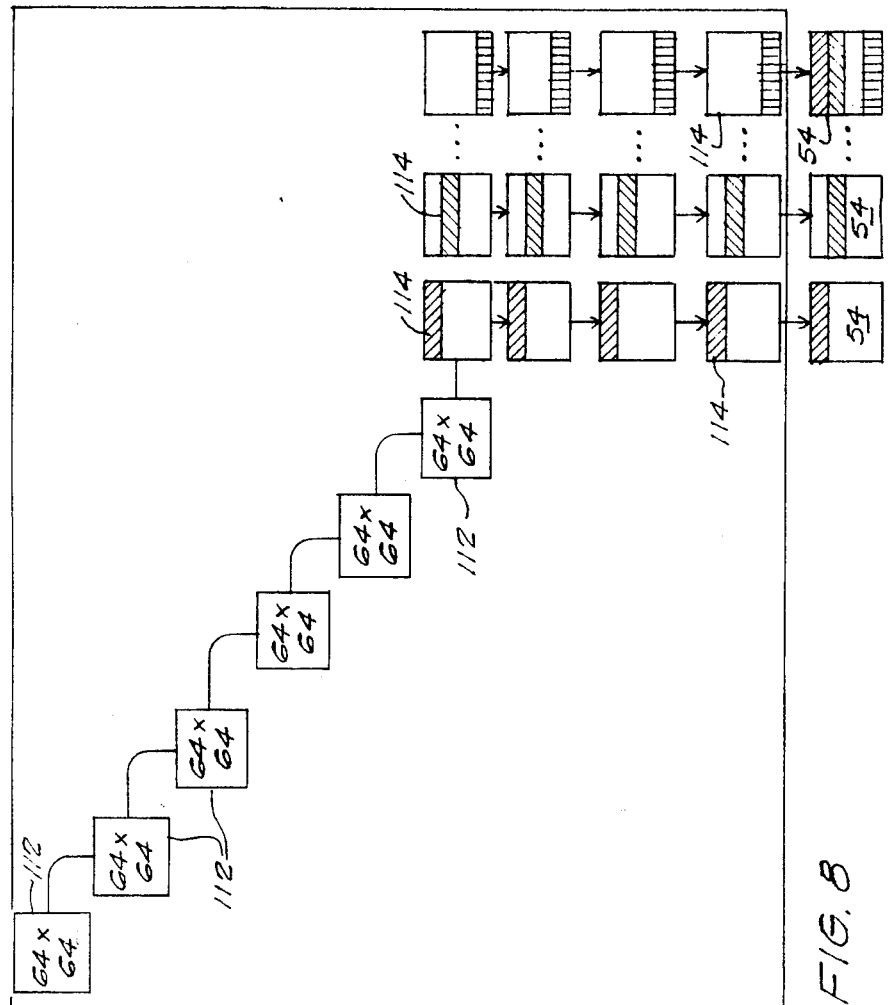
FIG. 8 is a representation like FIG. 2 of a further embodiment of the invention.

In contrast to image processing which employs macrospan operations with image fields of selected different resolutions, as shown in FIG. 2, FIG. 8 shows another embodiment of the FIG. 1 system which executes macrospan imaging operations with image fields of uniform resolution. U.S. Pat. No. 4,384,336 discloses one form of this image processing technique with reference to FIG. 4 of that patent. This example of this practice of the invention, with an image field having an ultimate resolution with (512×512) values, employs macrospan operations with relatively low resolution, coarse fields 112 each of (64×64) values. FIG. 8 sets forth information for this embodiment with nine process stages, the same as in FIG. 2 for ready comparison. Stages one through six of the FIG. 6 sequence perform macrospan operations, and in each the image memory is required to store sets of values each having (64×64) bytes, i.e. the image memory requires 4096 bytes capacity for each array of values. The table in FIG. 8 sets forth that the first processing stage compares the information at pixels located a half field apart, or separated by 32 pixels in the coarse array. This corresponds to a comparison separation of 256 pixels in the full resolution field, as also set forth.

The comparison separation decreases by a factor of two in each successive process stage until in stage six the separation is one unit of the coarse (64×64) array.

The illustrated sequence then switches to microspan operations for each of stages seven, eight and nine, and processes only strips 114 of the full image field in each of the latter stages. In the illustrated embodiment of FIG. 8, each such strip has (512×8) values and represents a like number of pixels in the full resolution image field. This requires the same size image memory, i.e. 4096 bytes per array, as stages one through six. The comparison separation for the microspan imaging operations of these last three stages is four, two and one respectively. The strip processing of stages seven, eight and nine includes discarding of erroneous values due to strip-boundary portion and includes the overlapping of successive strips, as described with reference to FIGS. 5, 6 and 7.

FIG. 9 is a flow chart which summarizes image processing according to the invention, as illustrated with the embodiments of FIGS. 2 and 8. The illustrated operation commences with a first step 120 in which the scale of interactions of an input field of values with a processed field of values is set. This operating step can include expand and/or compress operations as illustrated in FIGS. 5-7, and a change in comparison separations as illustrated in FIG. 8. A subsequent step 122 executes one cycle of image processing with the two fields of values. These two steps 120 and 122 form one stage of macrospan processing, as shown in FIGS. 2 and 8.

The operating sequence of the flow chart next executes a decision to determine whether to end the processing on a full field basis i.e. to end the macrospan process, with decision 124. A negative response returns the sequence to repeat the steps 120 and 122. An affirmative decision advances the operation to step 126, in which a selected strip of values in the input field and an identically located strip in the processed field are scaled, e.g., expanded and/or compressed as appropriate. The two identically scaled strips are then image processed in step 128, with discarding of erroneous strip-boundary values and overlapping of successive strips as described above with reference to FIGS. 5, 6, and 7. The next step, 130, formats the resultant strips of image information.

These steps, 126, 128 and 130 together form one stage of microspan processing, as further illustrated in the embodiments of FIGS. 2 and 8.

The illustrated flow chart of FIG. 9 next determines, with decision 132, whether the last strip of the image field has been processed. A negative determination returns the operation to repeat steps 126, 128 and 130. An affirmative result, on the other hand, advances the operation to step 134, in which the formatted resultant is processed as desired.

The parameters described herein for sizes of image fields, arrays, strips and the like, as well as memory requirements, are illustrative. Further, the terms macrospan and microspan are used with reference to comparative computations performed, in effect, on differently spaced locations in a field of image-related values. The distinction between the two operations can be selected for any given practice of the invention. Factors involved in the selection include the size and the resolution of the image field being processed, and the available image memory capacity.

It will thus be seen that the invention efficiently attains the objects set forth above, among those made apparent from the preceding description. Certain changes may be made in carrying out the above methods and in the construction set forth without departing from the scope of the invention. Hence, all matter contained in the above description or shown in the accompanying drawings is to be interpreted as illustrative and not in a limiting sense.

It is also to be understood that the following claims cover all of the generic and specific details of the invention herein described, and all statements of the scope of the invention which as a matter of language might be said to fall therebetween.

Having described the invention, what is claimed as new and secured by Letters Patent is:

1. In the processing of a set of values representing an image field and wherein the processing includes plural computational operations with values representing spatially different locations of said field, the improvement comprising the steps of
   A. storing in a read/write memory element a first set of values that represents said image field,
   B. performing at least one computational operation on said first set of values, to produce an intermediate set of values representing substantially all locations of said image field,
   C. storing second sets of values that represent only segmental portions of said same image field in locations of said memory element which at a different time stored values of said first set thereof,
   D. performing plural further computational operations on said second sets of values, to produce plural second resultant sets of values, each of which represents only a segmental portion of said image field and different ones of which represent different segmental portions of said image field, and
   E. producing a resultant set of values, representing substantially all locations of said image field, in response to said intermediate set of values, which represents substantially all locations of said image field, and to plural second sets of values representing different segmental portions of said field.

2. In image processing according to claim 1, the further improvement comprising the steps of
   A. providing a photographic record of said image field, and
   B. reading said photographic record a first time to produce said first set of values and reading said photographic record at least a second time to produce said second sets of values.

3. In image processing according to claim 2, the further improvement comprising the steps of
   A. storing in a read/write memory element a relatively coarse detail representation of said image field read from said record and producing said first set of values from said storage, and
   B. storing in a read/write memory element a relatively fine detail representation of at least a portion of said same image field read from said record and producing second sets of values from said latter storage.

4. In image processing according to claim 1, the further improvement comprising the steps of
   A. producing said first set of values to constitute a relatively coarse detail representation of substantially all locations of said image field, and
   B. producing at least one second set of values for each further computational operation to constitute a relatively fine detail representation of a segmental portion of said same image field.

5. In image processing according to claim 1, the further improvement comprising the step of
   performing each further computational operation on both a second set of values representing only a portion of said image field and on a further set of values produced from said intermediate set of values.

6. In image processing according to claim 1, the further improvement comprising the step of
   discarding from each second resultant set of values those values which result from computational operations with values of a second set and representing locations of said field outside the segmented portion which that second set of values represents.

7. In image processing according to claim 6, the further improvement comprising the further step of
   formating different second resultant sets of values representing selectively overlapping different segmental field portions into a further set of values that represents substantially all locations of said image field.

8. In image processing according to claim 1, the further improvement comprising the step of
   formatting different second resultant sets of values representing different segmental field portions into a further set of values that represents substantially all locations of said image field.

9. In image processing according to claim 8, the further improvement comprising the step of
   storing image field information responsive to each second resultant set of values on a photographic medium for said formatting of second resultant sets of values.

10. In image processing according to claim 1, the further improvement comprising the steps of
    A. storing in a read/write memory element a relatively coarse detail representation of said image field and producing said first set of values from said storage, B. storing in a read/write memory element a relatively fine detail representation of at least a portion of said same image field and producing second sets of values from said storage, and C. performing said latter storage at least in part during the execution of said former computational operations.

11. In automated image processing with computational operations on sets of values representing an image field, the improvement comprising the steps of A. providing a photographic record of said image field, B. reading said photographic record a first time to produce a first set of values representing at least a first portion of said image field, C. storing said first set of values in a first memory element, D. performing image processing operations with values produced in response to said first set of values stored in said first memory element to produce a set of intermediate values, E. reading said photographic record a second time to produce a second set of values representing at least a portion of said image field common to said first portion, F. storing said second set of values in locations of said first memory element which at a different time stored values of said first set thereof, and G. performing further image processing operations with said intermediate values and with values produced in response to said second set of values stored in said memory element, to produce a set of processed values representing at least said portion of said image field common to said first portion.

12. In image processing according to claim 11, the further improvement comprising discontinuing stored in said memory element of said first set of values read from said record prior to said storing therein of a second set of values read from said record.

13. In image processing according to claim 11, the further improvement comprising the steps of A. producing one of said first and second sets of values in response to substantially all portions of said image field and producing the other said set of values in response to a portion only of said image field, and B. producing said former set of values with lesser image resolution than said latter set of values.

14. In image processing according to claim 11, the further improvement comprising the step of
producing said first set of values in response to a greater portion of said image field than said second set of values and with lesser image resolution than that of said second set of values.

15. In automated image processing with computational operations on at least a set of values representing an image field, and wherein the processing includes a plurality of such computational operations, different ones of which employ sets of said values representing locations of said field having different spacings from one another, the improvement comprising the steps of A. storing in a read/write memory element a first set of values that constitutes a relatively coarse detail representation of said image field, B. performing at least a first computational operation on said first set of values to produce an intermediate set of values representing substantially all locations in said image field, C. storing different second sets of values, each of which constitutes a relatively fine detail representation of a different segmental portion of said image field, in locations of said memory element which at a different time stored values of said first set thereof, D. performing plural second computational operations on said different second sets of values to produce plural second resultant sets of values representing correspondingly different segmental portions of said image field, and E. producing a resultant set of values, representing substantially all locations of said image field, in response to an arithmetic combination of said intermediate set of values and to plural second sets of values representing different field portions.

16. In the processing of a set of values representing an image field and wherein the processing includes both macrospan computational operations with values representing relatively widely-spaced locations of said field and microspan computational operations with values representing relatively closely-spaced locations of said image field, the improvement comprising the steps of A. storing in a read/write memory element first values that constitute a relatively coarse detail representation of said image field, B. performing said macrospan operations on said first values to produce a first resultant set of values representing substantially all locations of said image field, C. storing different second sets of values, each of which represents only a segmental portion of said same image field, in locations of said memory element which at a different time stored said first values, D. performing individual ones of said microspan operations on said different second sets of values, and on a subset of said first resultant set of values corresponding to that field portion, to produce plural second resultant sets of values each of which represents a corresponding segmental portion of said image field, and E. producing a resultant set of values representing substantially all locations of said image field, in response to plural second sets of values representing different field portions.

17. In apparatus for processing a set of values representing an image field and wherein the processing includes plural computational operations with values representing spatially different locations of said field, the improvement comprising A. means including a read/write memory element for storing a first set of values that represents said image field, B. means for performing at least one computational operation on said first set of values, to produce an intermediate set of values representing substantially all locations of said image field, C. means for storing second sets of values that represent only segmental portions of said same image field in locations of said memory element which at a different time stored values of said first set thereof, D. means for performing plural further computational operations on said second sets of values, to produce plural second resultant sets of values, each of which represents only a segmental portion of said image field and different ones of which represent different segmental portions of said image field, and E. means for producing a resultant set of values representing substantially all locations of said image field, in response to said intermediate set of values, which represents substantially all locations of said image field, and to plural second sets of values representing different segmental portions of said field.

18. In image processing apparatus according to claim 17, the further improvement comprising
   A. a photographic record of said image field, and
   B. means for reading said photographic record to produce said first set of values and for reading said photographic record to produce said second sets of values,
   C. a first read/write memory element, and
   D. means for storing in said first memory element a relatively coarse detail representation of said image field read from said record and for producing said first set of values from said storage, and for storing in said memory element a relatively fine detail representation of at least a portion of said same image field read from said record and for producing second sets of values from said latter storage.

19. In image processing apparatus according to claim 17, the further improvement comprising
   means for formatting different second resultant sets of values representing different segmental field portions into a further set of values that represents substantially all locations of said image field.

20. In automated image processing apparatus which executes computational operations on sets of values representing an image field, the improvement comprising
   A. means providing a photographic record of said image field,
   B. means for reading said photographic record a first time to produce a first set of values representing at least a first portion of said image field,
   C. means including a first memory element for storing said first set of values in said memory element,
   D. means for performing image processing operations with values produced in response to said first set of values stored in said first memory element to produce a set of intermediate values,
   E. means for reading said photographic record a second time to produce a second set of values representing at least a portion of said image field common to said first portion,
   F. means for storing said second set of values in locations of said first memory element which at a different time stored values of said first set thereof, and
   G. means for performing further image processing operations with said intermediate values and with values produced in response to said second set of values stored in said memory element, to produce a set of processed values representing at least said portion of said image field common to said first portion.

21. In automated image processing apparatus which executes computational operations on at least a set of values representing an image field, and wherein the processing includes a plurality of such computational operations, different ones of which employ sets of said values representing locations of said field having different spacings from one another, the improvement comprising
   A. means including a read/write memory element for storing in said element a first set of values that constitutes a relatively coarse detail representation of said image field,
   B. means of performing at least a first computational operation on said first set of values to produce an intermediate set of values representing substantially all locations in said image field,
   C. means for storing different second sets of values, each of which constitutes a relatively fine detail representation of a different segmental portion of said image field, in locations of said memory element which at a different time stored values of said first set thereof,
   D. means of performing plural second computational operations on said different seconds sets of values to produce plural second resultant sets of values representing correspondingly different segmental portions of said image field, and
   E. means of producing a resultant set of values, representing substantially all locations of said image field, in response to an arithmetic combination of said intermediate set of values and to plural second sets of values representing different field portions.

22. In image processing with computational operations on at least a set of values representing locations in an image field, the improvement comprising the steps of
   A. performing at least a first computational operation on a first set of values that constitutes a relatively coarse detail representation of said image field, to produce an intermediate set of values representing with coarse detail substantially all locations in said image field,
   B. performing second computational operations successively on different second sets of values, each of which constitutes a relatively fine detail representation of a different fractional portion only of said same image field, to produce successively, plural second resultant sets of values representing with fine detail correspondingly different fractional portions only of said image field, and
   C. producing a resultant set of values, representing substantially all locations of said image field, in response to said intermediate set of values representing with coarse detail substantially all locations in said image field and in response to said plural second sets of values representing with fine detail only different field portions.

23. In image processing apparatus which executes computational operations on at least a set of values representing locations in an image field, the improvement comprising
   A. means of performing at least a first computational operation on a first set of values that constitutes a relatively coarse detail representation of said image field, to produce an intermediate set of values representing with coarse detail substantially all locations in said image field,
   B. means of performing second computational operation successively on different second sets of values, each of which constitutes a relatively fine detail representation of a different fractional portion only of said same image field, to produce successively, plural second resultant sets of values representing with fine detail correspondingly different fractional portions only of said same image field, and
   C. means of producing a resultant set of values, representing substantially all locations of said image field, in response to said intermediate set of values representing with coarse detail substantially all locations in said image field and in response to said plural second sets of values representing with fine detail only different field portions.

* * * * *

UNITED STATES PATENT AND TRADEMARK OFFICE
CERTIFICATE OF CORRECTION

PATENT NO. : 4,750,211
DATED : 7 June 1988
INVENTOR(S) : William R. Wray

It is certified that error appears in the above-identified patent and that said Letters Patent is hereby corrected as shown below:

At Column 3, line 43, replace "singleresolution" with --single resolution--.

At Column 4, line 17, replace "repreare sents" with --represents--.

At Column 4, line 28, replace "values-produced" with --values produced--.

At Column 1, line 43, replace "invention is to provide" with --invention to provide--.

At Column 5, line 43, replace "photolectric" with --photoelectric--.

Signed and Sealed this

Second Day of January, 1990

*Attest:*

JEFFREY M. SAMUELS

*Attesting Officer*     *Acting Commissioner of Patents and Trademarks*